United States Patent [19]

Seymour

[11] 4,174,376

[45] Nov. 13, 1979

[54] PROCESS FOR MANUFACTURING POTASSIUM POLYPHOSPHATE

[75] Inventor: James E. Seymour, Virginia Beach, Va.

[73] Assignee: Royster Company, Norfolk, Va.

[21] Appl. No.: 855,780

[22] Filed: Nov. 29, 1977

[51] Int. Cl.² .................. C01B 15/16; C01B 25/26
[52] U.S. Cl. .................................. 423/315; 71/34
[58] Field of Search ............... 423/310, 313, 315, 319; 71/34

[56] References Cited

U.S. PATENT DOCUMENTS

| | | | |
|---|---|---|---|
| 2,716,591 | 8/1955 | Thomsen | 423/319 |
| 3,600,152 | 8/1971 | Drechsel | 71/34 |
| 3,635,669 | 1/1972 | Rubin | 423/319 |
| 3,697,246 | 10/1972 | Drechsel et al. | 71/34 |
| 3,803,884 | 4/1974 | Thompson | 71/34 |

Primary Examiner—Delbert E. Gantz
Assistant Examiner—Gregory A. Heller
Attorney, Agent, or Firm—Stoll and Stoll

[57] ABSTRACT

A method for manufacturing potassium polyphosphate from ammonium bisulfate, sulfuric acid, phosphate rock and water, wherein the phosphate rock decomposition is passed through a gypsum filter, muriated potash and/or potassium sulfate is added to the basic filtrate, potassium fluosilicate is filtered off to market or alternate process, muriated potash is again added and the combination heated to the polymerization point to drive off (vaporize) ammonium chloride, muriatic acid and water, whereby potassium polyphosphate is produced. Concentrated sulfuric acid is added to the vapor phase and the product is scrubbed with the ammonium bisulfate and sulfuric acid being returned to process input.

2 Claims, 1 Drawing Figure

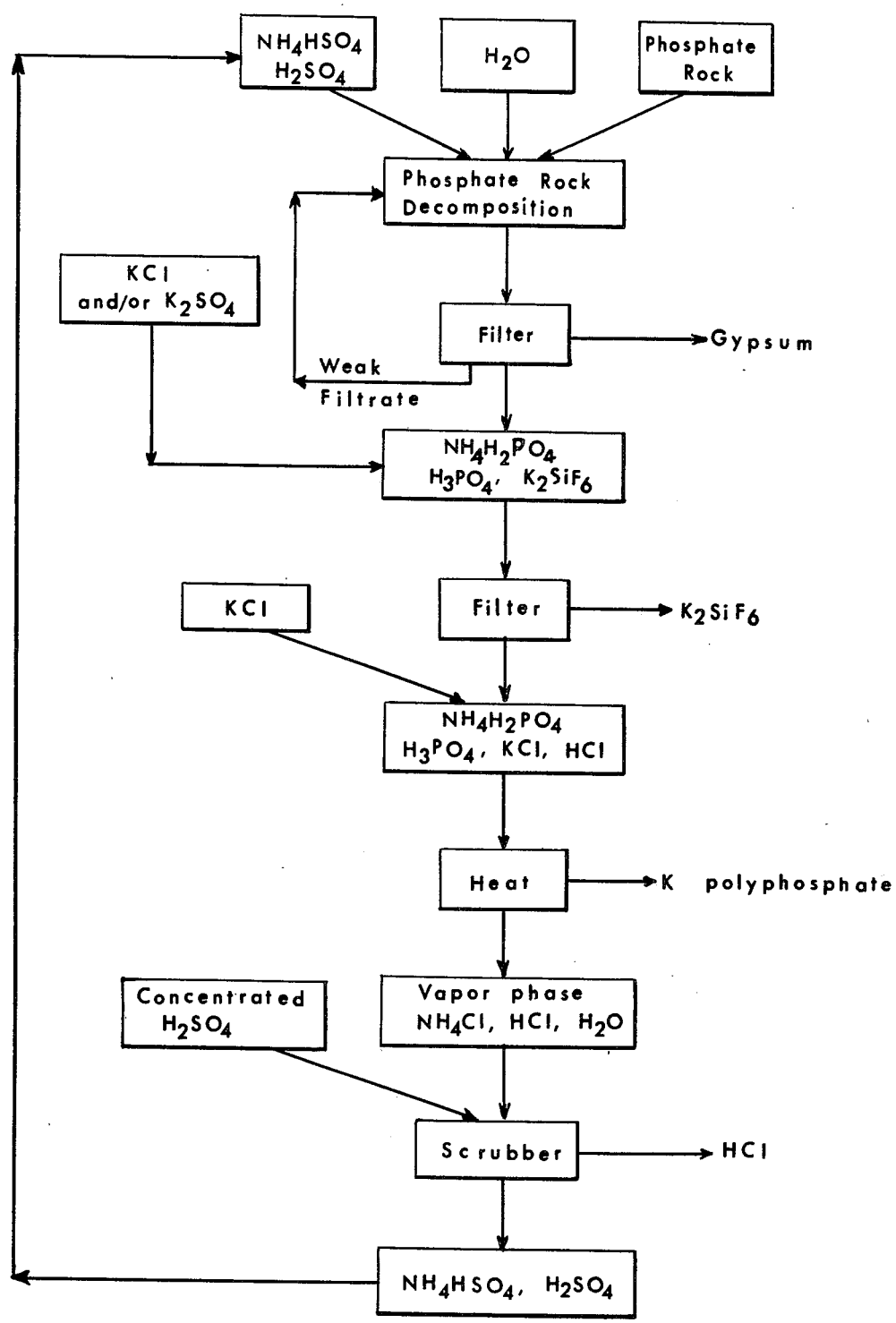

PROCESS FOR MANUFACTURING POTASSIUM POLYPHOSPHATE

REFERENCE TO RELATED DOCUMENT

This application is related to Disclosure Document No. 45,247, filed Dec. 3, 1975, the benefit of which is claimed.

SUMMARY OF THE INVENTION AND DESCRIPTION OF THE DRAWING

The invention provides a method for manufacture of potassium polyprosphate wherein there is enhanced recovery of saleable products, the product does not contain fluorine yet there is no fluorine pollution problem, there is no loss of potassium monoxide and all is recovered in saleable form, all vapor-phase products except hydrochloric acid are recycled to the phosphate rock decomposition, all of the phosphoric anhydride is as potassium polyphosphate and the process is less hazardous.

The invention may be understood from the schematic flow chart shown in the accompanying FIGURE of the drawing.

DESCRIPTION OF A PREFERRED EMBODIMENT

The process as indicated in the accompanying drawing constitutes a method of manufacturing potassium polyphosphate from ammonium bisulfate, being regenerated at least in part in the process, sulfuric acid, phosphate rock and water. The combination of these input constituents is the first step in the process and is represented by the following:

$$Ca_{10}(PO_4)_6.F_2 + 3NH_4HSO_4$$
$$+ 7H_2SO_4 + nH_2O + \tfrac{1}{3}SiO_2 \rightarrow 3NH_4H_2PO_4 + 3H_3PO_4 + \tfrac{1}{3}H_2SiF_6$$
$$+ 10CaSO_4.2H_2O + (n-19\tfrac{1}{3})H_2O$$

The product of the combination, decomposed phosphate rock, is passed through a gypsum filter in the second process step with weak filtrate being recycled through the filter. The only non-marketable reaction product of the process is the gypsum cake resultant of this filtration.

There are added to the phosphate rock decomposition filtrate, as the third process step, muriated potash and/or potassium sulfate, the combination of which is again filtered, this time to remove potassium fluosilicate which is a marketable commodity or may be used in a different process, as the fourth process step. The third process step is represented by the following:

$$3NH_4H_2PO_4 + 3H_3PO_4 + \tfrac{1}{3}H_2SiF_6 + \tfrac{2}{3}KCl + (n-19\tfrac{1}{3})H_2O \rightarrow 3NH_4H_2PO_4 + 3H_3PO_4 + \tfrac{2}{3}HCl + (n-19\tfrac{1}{3})H_2O + \tfrac{1}{3}K_2SiF_6$$

Additional muriated potash is added in the fifth process step and the combination is heated as the sixth process step to the polymerization point (approximately 350° C.) to drive off ammonium chloride, muriatic acid and water as vapor, thereby yielding the potassium polyphosphate product. The fifth and sixth process steps are indicated:

$$3NH_4H_2PO_4 + 3H_3PO_4 + \tfrac{2}{3}HCl + (n-19\tfrac{1}{3})H_2O +$$

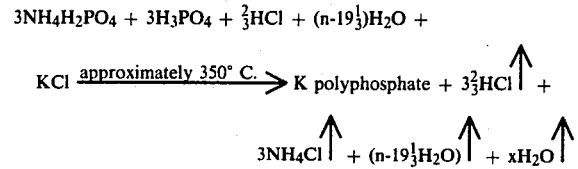

$$KCl \xrightarrow{\text{approximately } 350° C.} K \text{ polyphosphate} + 3\tfrac{2}{3}HCl\uparrow +$$

$$3NH_4Cl\uparrow + (n-19\tfrac{1}{3}H_2O)\uparrow + xH_2O\uparrow$$

$xH_2O$ is determined by the degree of potassium phosphate polymerization.

The polymerization reactions are the following:

$$6KH_2PO_4 \xrightarrow{\text{Heat}} 3K_2H_2P_2O_7 + 3H_2O$$

$$3K_2H_2P_2O_7 \xrightarrow{\text{Heat}} 2K_3H_2P_3O_{10} + H_2O$$

$$2K_3H_2P_3O_{10} \xrightarrow{\text{Heat}} 6KPO_3 + 2H_2O$$

The combination of these polymerization reactions is:

$$6KH_2PO_4 \xrightarrow{\text{Heat}} 6KPO_3 + 6H_2O$$

To the vapor phase result of the sixth process step is added concentrated sulfuric acid as the seventh process step and the combination is scrubbed in the eighth process step to yield ammonium bisulfate, sulfuric acid and water, all recycled to the process input, and muriatic acid, recovered for market or for an alternative process. The seventh and eighth process steps are indicated:

$$3\tfrac{2}{3}HCl + 3NH_4Cl + (n-19\tfrac{1}{3})H_2O + xH_2O + 10H_2SO_4 \rightarrow 6\tfrac{2}{3}HCl\uparrow + 3NH_4HSO_4 + 7H_2SO_4 + (n-19\tfrac{1}{3})H_2O + xH_2O$$

The HCl is recovered to market or to $Cl_2$ process. $3NH_4HSO_4 + 7H_2SO_4 + (n-19\tfrac{1}{3})H_2O + xH_2O$ is recycled to the first reaction (phosphate rock decomposition). $(19\tfrac{1}{3} - x)H_2O$ is required for that decomposition reaction as the make-up minimum.

What is claimed is:

1. A process for making potassium polyphosphate, comprising the steps of:
   (a) combining ammonium bisulfate, sulfuric acid, phosphate rock and water to form decomposed phosphate rock,
   (b) filtering the decomposed phosphate rock,
   (c) adding to the decomposed phosphate rock filtrate a material selected from the group consisting of potassium chloride, potassium sulfate and potassium chloride and potassium sulfate to yield combination;
   (d) filtering said first combination to remove potassium fluosilicate,
   (e) adding additional potassium chloride to the filtrate to yield a second combination, said additional potassium chloride being added in an amount sufficient to permit polymerization under heat of said second combination,
   (f) heating said second combination to at least the polymerization point,
   (g) separating solid potassium polyphosphate from the vapor phase of the second combination,
   (h) processing said second combination following said removal of potassium polyphosphate to yield bisulfate and sulfuric acid, and (i) recycling the ammonium bisulfate and sulfuric acid to the process input.

2. A process for making potassium polyphosphate, comprising the steps of:
(a) combining ammonium bisulfate, sulfuric acid, phosphate rock and water to form decomposed phosphate rock,
(b) filtering the decomposed phosphate rock,
(c) adding to the decomposed phosphate rock filtrate a material selected from the group consisting of potassium chloride, potassium sulfate and potassium chloride and potassium sulfate to yield a first combination,
(d) filtering said first combination to remove potassium flousilicate,
(e) adding additional potassium chloride to the filtrate to yield a second combination, said additional potassium chloride being added in an amount sufficient to permit polymerization under heat of said second combination,
(f) heating said second combination to at least the polymerization point,
(g) separating solid potassium polyphosphate from the vapor phase of the second combination,
(h) adding concentrated sulfuric acid to said second combination,
(i) scrubbing the concentrated sulfuric acid and said second combination to yield hydrochloric acid, ammonium bisulfate, sulfuric acid and water,
(j) recycling the ammonium bisulfate, sulfuric acid and water to process input, and
(k) recovering the hydrochloric acid.

* * * * *